United States Patent [19]

Berger

[11] Patent Number: 4,672,451

[45] Date of Patent: Jun. 9, 1987

[54] DYNAMIC DIGITAL VIDEO CORRECTION CIRCUIT

[75] Inventor: Robert O. Berger, Fullerton, Calif.

[73] Assignee: Hughes Aircraft Company, Los Angeles, Calif.

[21] Appl. No.: 808,405

[22] Filed: Dec. 12, 1985

[51] Int. Cl.[4] ........................ H04N 5/235; H04N 5/57

[52] U.S. Cl. .................................... 358/168; 358/163; 340/793; 340/812

[58] Field of Search ................. 358/168, 169, 163, 74, 358/243; 315/383; 340/793, 812, 785

[56] References Cited

U.S. PATENT DOCUMENTS

| | | | |
|---|---|---|---|
| 4,150,365 | 4/1979 | Natori et al. | 340/785 X |
| 4,173,758 | 11/1979 | Sekine | 340/785 |
| 4,212,008 | 7/1980 | Hopkins, Jr. | 340/793 X |
| 4,371,268 | 2/1983 | Miyasaka et al. | 340/785 X |
| 4,393,378 | 7/1983 | Danielsen et al. | 340/812 X |
| 4,517,560 | 5/1985 | Murayama et al. | 340/728 X |

*Primary Examiner*—Michael A. Masinick
*Assistant Examiner*—E. Anne Toth
*Attorney, Agent, or Firm*—Robert Thompson; A. W. Karambelas

[57] ABSTRACT

A video compensation circuit for compensating the displayed intensity of isolated pixels is disclosed. The video compensation circuit includes a shift register (20) having a plurality of stages (11,13,15) for storing and shifting a serially input digital video signal (DV) and for outputting an output digital video signal (DDV), detection circuitry (17) responsive to the respective outputs of the shift register stages for providing a detection output indicative of the presence of a predetermined sequence of digital video data in the shift register stages, and synchronizing circuitry (19) coupled to the detection circuit for providing in response to the detection output a control signal (DCS) synchronized to the bit of the output digital video signal which corresponds to the pixel to be compensated.

2 Claims, 4 Drawing Figures

DYNAMIC DIGITAL VIDEO CORRECTION CIRCUIT

BACKGROUND OF THE INVENTION

The disclosed invention generally relates to video circuits, and is particularly directed to a digital circuit for compensating the apparent reduced intensity of isolated pixels on a raster scan video display.

The availability of relatively inexpensive data processing capabilities has resulted in the wide use of raster scan cathode ray tube (CRT) video displays. A common characteristic of substantially all CRT video displays is that a spot or pixel is not a circular region of uniform intensity. Typically, a pixel is a generally circular region with a Gaussian distribution of intensity whereby intensity is greatest at the center and decreases toward the periphery of the pixel region. As a result of this characteristic, an area having a single pixel with at most one or two adjacent illuminated pixels appears to the viewer as being dimmer than an area having several adjacent illuminated pixels. Alphanumeric characters therefore do not appear as uniformly illuminated distinct characters. The apparent intensity differences between different portions of alpha numeric characters may readily result in viewer discomfort, eyestrain and/or misinterpretation.

The problems associated with non-uniform pixel intensity are particularly aggravated in low cost CRT displays which utilize video drivers having inexpensive circuitry to minimize cost, which almost always means reduced bandwidth. Further, the less expensive video mixers also tend to deteriorate the video signal.

The problems associated with non-uniform pixel intensity are typically reduced by increased bandwidth and more expensive CRT display circuitry. However, that approach is of no help to less expensive CRT displays.

SUMMARY OF THE INVENTION

It would therefore be an advantage to provide a video compensation circuit for compensating the effects of non-uniform pixel intensity.

It would further be an advantage to provide a video compensation circuit which cooperates with low cost video circuitry to provide displayed alphanumeric characters which are clear and distinct.

It would also be an advantage to provide a video compensation circuit which cooperates with a reduced bandwidth video driver to provide displayed alphanumeric characters which are clear and distinct.

It would be another advantage to provide a video compensation circuit which detects and compensates video patterns that produce non-distinct alphanumeric characters.

It would still be another advantage to provide a video compensation circuit which varies the intensity of individual pixels to produce clear and distinct alpha numeric characters.

The foregoing and other features are provided in a video compensation circuit which includes a shift register having a plurality of stages for storing and shifting a serially input digital video signal and for outputting an output digital video signal, detection circuitry responsive to the respective outputs of the shift register stages for providing a detection output indicative of the presence of a predetermined sequence of digital video data in the shift register stages, and synchronizing circuitry coupled to the detection circuit for providing in response to the detection output indicative of the presence of the predetermined sequence a control signal synchronized to the bit of the output digital video signal which corresponds to the pixel to be compensated.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION

Figures 1, 2:
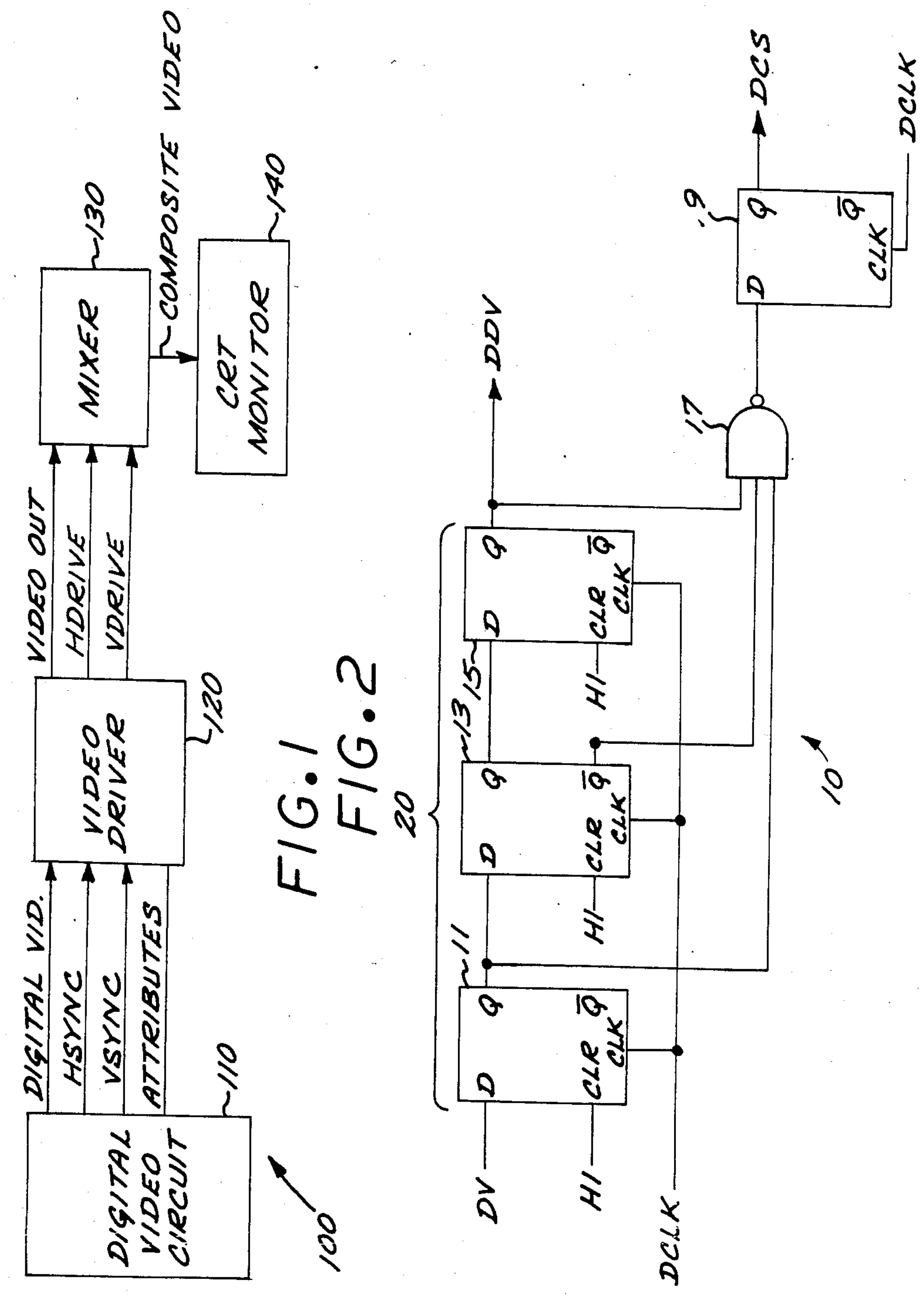
FIG. 1 is a block diagram of a generalized video display system.
FIG. 2 is a schematic diagram of the disclosed video compensation circuit for use with video display systems such as the one of FIG. 1.

In the following detailed description and in the several figures of the drawing, like elements are identified with like reference numerals.

Referring now to FIG. 1, shown therein is a generalized block diagram of a standard video display system 100 which includes a digital video circuit 110, a video driver 120, a video mixer 130, and a cathode ray tube (CRT) monitor 140.

The digital video circuit 110 provides as outputs a digital video signal, the horizontal and vertical synchronization signals, and attribute control signals. As is well known, such attribute control signals control display attributes such as highlighting, reverse video, and underscoring. The digital video circuit 110 may be readily implemented utilizing known techniques. For example, the digital video circuit 110 may be based on the Intel 8275 integrated circuit controller.

The digital video signal, the synchronization signals, and the attribute control signals of the digital video circuit 110 are provided to the video driver circuit 120 which provides as an output an analog video signal which is a function of the digital video signal and the attribute control signals. As is well known in the art, the analog video signal output of the video driver circuit 120 controls the intensity of the CRT electron beam of the video monitor 140. The video driver circuit 120 further provides as outputs a horizontal drive signal and a vertical drive signal. Implementations for the video driver 120 are well known in the art.

The analog video signal, the horizontal drive signal, and the vertical drive signal from the video driver 120 are provided to the video mixer 130 which produces a composite video signal that is provided to the CRT monitor 140. To the extent some CRT monitors do not require a composite video signal, the video mixer 130 is not utilized; and the analog video signal, the horizontal drive signal, and the vertical drive signal are directly provided to the CRT monitor. Implementations for the video mixer 130 are well known in the art.

Referring now to FIG. 2, shown therein is a circuit schematic of the video compensation circuit 10 of the invention which is interposed between the digital video circuit 110 and the video driver 120. Particularly, the video compensation circuit 10 includes a shift register 20 which accepts a digital video signal DV at its input and provides at its output a delayed digital video signal DDV which is a delayed replica of the digital video signal DV. For use with the generalized video display system 100 of FIG. 1, the shift register 20 would receive its input from the digital video circuit 110 and would provide its output to the video driver 120.

The shift register 20 has three stages and particularly includes a D-type flip-flop 11 as a first stage for accepting the digital video signal DV at its D input. The non-inverted Q output of the flip-flop 11 is coupled to the D input of a second stage D-type flip-flop 13. The non-inverted Q output of the second stage flip-flop 13 is coupled to the D input of a third stage D-type output flip-flop 15. The non-inverting Q output of the third stage flip-flop 15 provides the delayed digital video signal DDV. The flip-flops 11, 13, 15 have their respective clear inputs CLR connected to a high logic level and are clocked by a dot clock DCLK. As is well known, a dot clock provides the basic pixel timing for a video display system.

A three input NAND gate 17 is responsive to predetermined outputs of the flip-flops 11, 13, 15. Specifically, the Q output of the first stage flip-flop 11, the negated output Q′ of the second stage flip-flop 13, and the Q output of the third stage flip-flop 15 are inputs to the NAND gate 17. The output of the NAND gate 17 is coupled to the D input of a D-type flip-flop 19 which is clocked with the dot clock DCLK. The clear input CLR of the flip-flop 19 coupled to a high logic level. Either of the outputs Q, Q′ of the flip-flop 19 may be utilized as a dot compensation signal, the Q output is shown as providing the dot compensation signal DCS.

In the video compensation circuit 10, a pixel will be ON pursuant to a low (0) digital data bit, and a pixel will be OFF pursuant to a high (1) digital data bit. The shift register 20 stores three bits of the digital video signal DV in order to allow the NAND gate 17 to detect a predetermined pattern. Specifically, the output of the NAND gate 17 goes low when the flip-flops 11, 13, 15 respectively provide outputs of high, low, high (1, 0, 1). Therefore, the video sequence 1, 0, 1 specifically indicates a pixel is on (0) while both pixels on either side are off (1).

Figure 3:
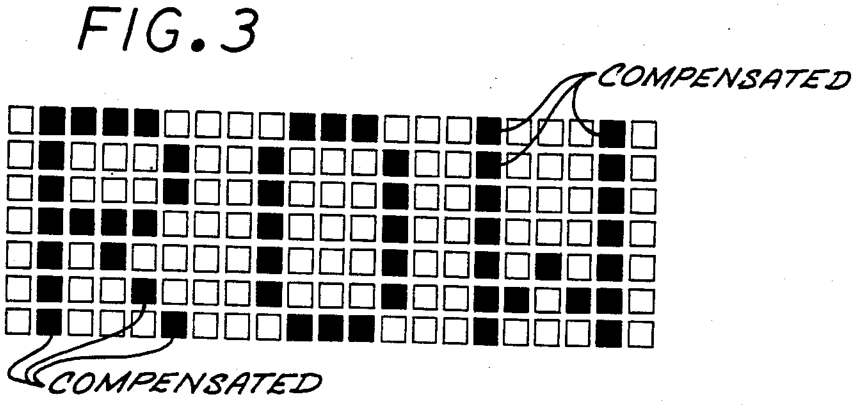
FIG. 3 is an example of a display dot matrix illustrating pixels which are compensated by the video compensation circuit of FIG. 2.

Referring now to FIG. 3, shown therein is a schematic representation of a display dot matrix which could be achieved with the generalized video system 100 of FIG. 1. The dark squares represent pixels which are ON, while the squares in outline represent pixels that are OFF. The compensation circuit 10 of FIG. 2 compensates for the display of pixels that are horizontally isolated. Examples of such isolated pixels which are compensated are identified in FIG. 3. As discussed further herein, the disclosed video system 100 allows for highlighting of selected characters.

In operation, the output of the NAND gate 17 will go low pursuant to the relevant transition (i.e., positive or negative going) of the dot clock DCLK that causes the 1, 0, 1 outputs of the flip-flops 11, 13, 15. That low signal is therefore applied to the data input of the flip-flop 19. On the next relevant transition of the dot clock DCLK, the dot compensation signal DCS at the Q output of the flip-flop 19 will go low and the Q output of the third stage flip-flop 15 will go low pursuant to the low input from the second stage flip-flop 13. Thus, the dot compensation signal DCS and the delayed digital video signal DDV representing the isolated pixel requiring compensation are synchronized.

For video systems wherein a pixel is turned on pursuant to a high (1) video signal, a three input AND gate would be utilized instead of the NAND gate 17. The inputs of the AND gate would be respectively coupled to the Q′ output of the first stage flip-flop 11, the Q output of the second flip-flop 13, and the Q′ output of the third flip-flop 15. The AND gate would therefore provide a high output pursuant to the video sequence 0, 1, 0.

It should be noted that the video compensation circuit 10 effectively delays the digital video signal DV by three dot clock cycles. Therefore, other timing and attribute timing should also be delayed appropriately to be synchronized with the delayed digital video signal DDV.

The dot compensation signal DCS at the Q output of the flip-flop 19 is provided to a video driver which utilizes the DCS signal to selectively control the relative intensities of the pixels being displayed. Specifically, the isolated pixel which corresponds to the delayed video signal DDV which causes a low dot compensation signal DCS is controlled to be of greater intensity than other pixels. For example, a high dot compensation signal DCS may be utilized to provide a given intensity for non-isolated pixels. A low dot compensation signal DCS would then be utilized to provide a higher intensity for an isolated pixel. One way of accomplishing the different intensities would be to attenuate the analog video signal for non-isolated pixels.

Figure 4:
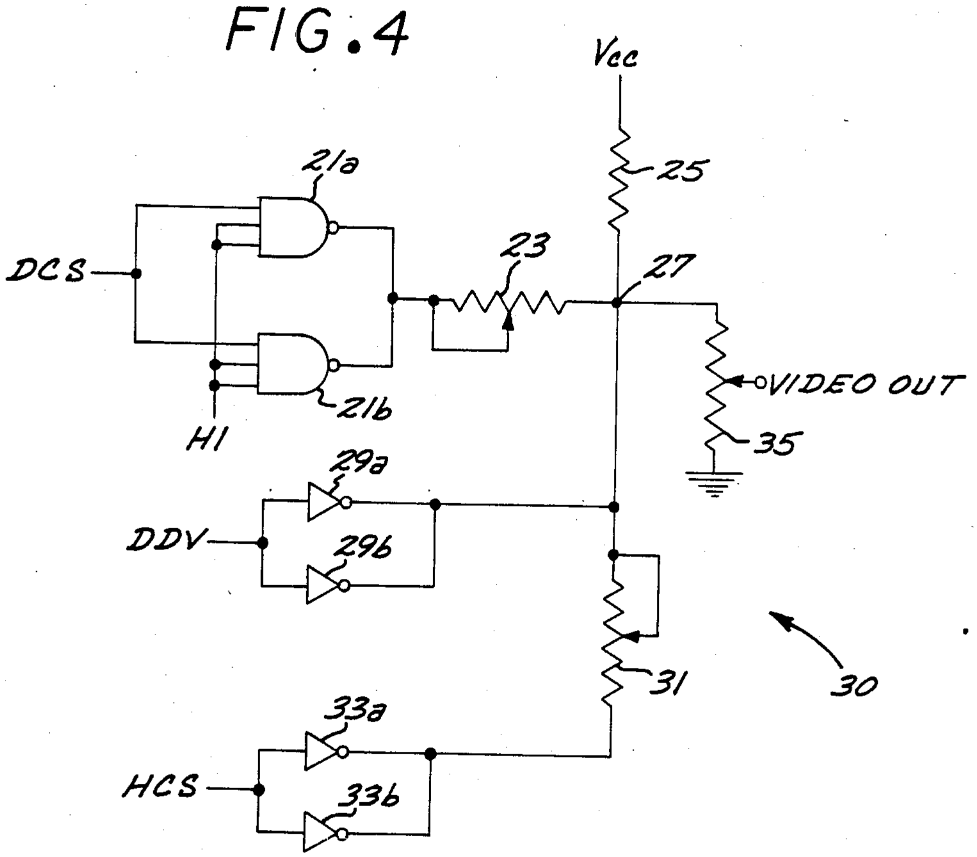
FIG. 4 is a schematic diagram of a video driver circuit which may be utilized with the video compensation circuit of FIG. 2.

Referring now to FIG. 4, shown therein is a partial video driver circuit 30 for use with the video compensation circuit 10 of FIG. 2. The video driver circuit 30 includes a pair of parallel open collector three input NAND gates **21*a* and 21*b* for respectively accepting as one input the dot compensation signal DCS from the flip-flop 19. Each of the NAND gates 21*a*, 21*b* has its other two inputs coupled to a high logic level. The NAND gates 21*a*, 21*b*** function as pull-down devices when the dot correction signal DCS is high.

The outputs of the NAND gates **21*a*, 21*b* are coupled to one terminal and the wiper contact of a potentiometer 23. The other terminal of the potentiometer 23 is coupled a node 27. A resistor 25 is coupled between a source of positive voltage $V_{CC}$ and the node 27**.

Further coupled to the node 27 are the outputs of a pair of parallel open collector inverters **29*a* and 29*b* which accept as inputs the delayed digital video signal DDV from the output flip-flop 15. The open collector inverters 29*a*, 29*b*** function as pull-down devices when the delayed digital video signal is high.

A potentiometer 31 has one terminal and the wiper contact coupled to the node 27, and has its other terminal coupled to the outputs of a pair of parallel open collector inverters **33*a* and 33*b*. A highlight control signal HCS is applied to the inputs of the inverters 33*a*, 33*b*** which function as pull-down devices when the highlight control signal HCS is high.

An analog video signal VIDEO OUT is provided at the wiper contact of a potentiometer 35 which has one terminal coupled to the node 27 and the other terminal coupled to ground.

In operation, the inputs to the video driver circuit 30 control the voltage of the analog video signal VIDEO OUT. When the delayed digital video signal DDV to the inverters **29*a*, 29*b* is high (pixel OFF), the voltage of the VIDEO OUT signal is at ground, regardless of the inputs to the inverters 33***a,* 33*b,* and the NAND gates 21*a,* 21*b.* When the digital video signal DDV to the inverters 29*a,* 29*b* is low (pixel ON), the voltage of the VIDEO OUT signal will be positive and will have a relative value that is a function of the levels of the highlight control signal HCS and the dot compensation signal DCS.

The convention for the highlight control signal HCS coupled to the inverters 33*a,* 33*b* is that a low signal indicates highlight and a high signal indicates no highlight. By way of example, the following Table I sets forth the relative voltages $V_i$ of the VIDEO OUT signal for different values of the dot correction signal DCS and the highlight control signal HCS. The relative value of $V_i$ increases with the subscript and therefore $V_4$ is greater than $V_3$ which is greater than $V_2$, and so forth.

TABLE I

| DCS | HCS | VIDEO OUT |
|---|---|---|
| HIGH | HIGH | $V_1$ |
| HIGH | LOW (highlight) | $V_2$ |
| LOW (compensate) | HIGH | $V_3$ |
| LOW (compensate) | LOW (highlight) | $V_4$ |

The relative voltage values for the different display intensities can be selectively varied by adjustment of the potentiometers 23 and 31. In use, the potentiometers 23 and 31 are adjusted so as to achieve the display of alphanumeric characters which are clear and distinct and of perceived uniform intensity for non-highlighted and high-lighted characters.

It should be readily apparent that the foregoing has desdribed and disclosed an advantageous video compensation circuit which compensates the visual effects of non-uniform pixel intensity to provide clear and distinct alphanumeric characters and which may be advantageously utilized with low cost reduced bandwidth video display circuitry.

Although the foregoing has been a description and illustration of specific embodiments of the invention, various modifications and changes thereto can be made by persons skilled in the art without departing from the scope and spirit of the invention as defined by the following claims.

What is claimed is:

1. A video compensation circuit for compensating the displayed intensity of isolated pixels comprising:

a shift register having three stages for storing and shifting a serially input digital video signal and for outputting an output digital video signal;

detection means including a NAND circuit having respective inputs coupled to be responsive to the respective outputs of said shift register stages for providing a detection output indicative of the presence of a predetermined sequence of digital video data in said shift register stages; and synchronizing means responsive to said detection means comprising a flip-flop for providing, in response to said detection output indicative of the presence of said predetermined sequence, a control signal synchronized to the bit of said output digital video signal which corresponds to the pixel to be compensated, whereby the intensity of horizontally isolated pixels can be made higher than the intensity of horizontally non-isolated pixels.

2. A video compensation circuit comprising:

storage means comprising a shift register having plurality of shift register stages for accepting digital video data and for providing a delayed digital video data output;

detection means including a NAND circuit having respective inputs coupled to be responsive to the outputs of said shift registers of said storage means for providing a detection output indicative of the presence of a predetermined sequence of digital video data stored by said storage means; and synchronizing means responsive to said detection means comprising a flip-flop means for providing, in response to said detection output indicative of said predetermined sequence, a control signal being synchronized to the delayed digital video data output bit which corresponds to the pixel to be compensated, whereby the intensity of isolated pixels can be made higher than the intensity of non-isolated pixels.

* * * * *